(12) United States Patent
Ito

(10) Patent No.: US 6,236,832 B1
(45) Date of Patent: May 22, 2001

(54) MUSIC-RELATED INFORMATION TRANSMITTED OVER MOBILE TELEPHONE NETWORK TO A REQUESTING USER

(75) Inventor: Seigo Ito, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/483,696

(22) Filed: Jan. 14, 2000

Related U.S. Application Data

(62) Division of application No. 09/234,259, filed on Jan. 20, 1999, which is a division of application No. 08/897,651, filed on Jul. 21, 1997, now Pat. No. 5,999,126.

(30) Foreign Application Priority Data

Aug. 6, 1996 (JP) ............................................. PO8-207433

(51) Int. Cl.[7] ...................................................... H04H 7/00
(52) U.S. Cl. ................................ 455/6.3; 455/414; 455/63
(58) Field of Search .................................... 455/6.3, 38.1, 455/517, 524, 422, 550, 566, 556, 414, 63; 370/328

(56) References Cited

U.S. PATENT DOCUMENTS

| | | | |
|---|---|---|---|
| 5,694,120 | * 12/1997 | Indekeu et al. | 455/38.1 |
| 5,694,455 | * 12/1997 | Goodman | 455/422 |
| 5,732,324 | * 3/1998 | Rieger, III | 455/6.3 |
| 6,014,569 | * 1/2000 | Bottum | 455/550 |
| 6,029,064 | * 2/2000 | Farris et al. | 455/412 |

FOREIGN PATENT DOCUMENTS

| | | |
|---|---|---|
| 6-148308 | 5/1994 | (JP) . |
| 6-311093 | 11/1994 | (JP) . |
| 8-018501 | 1/1996 | (JP) . |

* cited by examiner

Primary Examiner—Edward F. Urban
(74) Attorney, Agent, or Firm—Jay H. Maioli

(57) ABSTRACT

Music related information is transmitted to a user over a mobile telephone network, and the user can select a desired music program based on a display listing transmitted from the base station. The transmission speed of the transmitted data is checked and if the transmission speed is below a predetermined rate a data stream is generated every predetermined time with a portion of the music data being left out, so that a listenable audio signal can be produced based on this generated data stream.

8 Claims, 17 Drawing Sheets

MUSIC-RELATED INFORMATION TRANSMITTED OVER MOBILE TELEPHONE NETWORK TO A REQUESTING USER

This is a division of prior application Ser. No. 09/234,259 filed Jan. 20, 1999, which is a division of application Ser. No. 08/897,651 filed Jul. 21, 1997, now U.S. Pat. No. 5,999,126 issued Dec. 7, 1999.

BACKGROUND OF THE INVENTION

1. Field of the Invention

The present invention relates to a position measuring system and/or a navigation system, and more particularly to a system using a GPS. The present invention also relates to a navigation method, an information service method, an automotive go vehicle, and audio information transmitting and receiving method.

2. Description of the Related Art

Conventionally, a navigation system utilizing a position measuring system using artificial satellites called a GPS (Global Positioning System) has been widely known and has already been in widespread use in vehicles. In addition, a so-called hybrid type navigation system for navigation based on information from a gyro sensor or the like have also been used extensively in tunnels, valleys between tall buildings in town, and so on, where GPS radio waves from a satellite do not reach. A variety of receivers have been developed for position measuring systems using the GPS for applications other than in vehicles.

However, while a conventional system demonstrates its performance to some extent when it can receive a GPS radio wave, it has a disadvantage in that data from a gyro sensor, generated at a place where a GPS radio wave does not reach, include so many cumulative errors that they are not worth using. Also, while map matching is frequently performed, this is a mere correction of data so absolute measuring accuracy cannot be improved thereby. If the matching leads to an erroneous road, a worse result is introduced than without matching.

In addition, even when a GPS radio wave can be received, it cannot straightforwardly be said that a sufficient accuracy can be always provided since there is a mode for intentionally degrading the accuracy by the administrator of the GPS (the Department of Defense of the United States), and since radio wave transmission conditions may be disturbed by a perturbed ionospheric layer or the like which deteriorates the measuring accuracy.

SUMMARY OF THE INVENTION

The present invention is intended to solve the foregoing problems and provides for absolute position measuring without relying only on GPS radio waves to achieve high performance at a low cost.

According to a first aspect of the present invention, a position measuring apparatus includes a first position measuring means for position measuring a first position by receiving a first radio wave, a second position measuring means for position measuring a second position by receiving a second radio wave, an evaluating means for evaluating uncertainty in data derived from the first position measuring means and/or the second position measuring means, and a selecting means for selecting data from the first position measuring means or the second position measuring means based on an output signal from the evaluating means.

According to a second aspect of the present invention, a navigation apparatus includes a first position measuring means for position-measuring a first position by receiving a radio wave from a GPS satellite, a second position measuring means for measuring a second position by receiving a radio wave from a base station of a cellar telephone system without transmitting any request signal for position-measuring to the base station, an evaluating means for evaluating uncertainty of in data derived from the first position measuring means and/or the second position measuring means, a selecting means for selecting data from the first position measuring means or the second position measuring means based on an output signal from the evaluating means, a data storage means for storing map data, a display signal generating means for generating a display signal by combining an output signal from the selecting means and output data from the data storage means, and a display means for displaying the display signal.

According to a third aspect of the present invention, a position measuring method includes a first position measuring step for position measuring a first position by receiving a first radio wave, a second position measuring step for position measuring a second position by receiving a second radio wave, an evaluating step for evaluating uncertainty in data derived from the first position measuring step and/or the second position measuring step, and a selecting step for selecting data from the first position measuring step or the second position measuring step based on an output signal of the evaluating step.

According to a fourth aspect of the present invention, a navigation method includes a first position measuring step for position measuring a first position by receiving a radio wave from a GPS satellite, a second position measuring step for position measuring a second position by receiving a radio wave from a base station of a cellar telephone system without transmitting any request signal for position measuring to the base station, an evaluating step for evaluating uncertainty in data derived from the first position measuring step and/or the second position measuring step, a selecting step for selecting data from the first position measuring step or the second position measuring step based on an output signal from the evaluating step, and a display step for displaying a combined signal of an output signal from the selecting step and map data.

According to a fifth aspect of he present invention, an information distribution method includes a request signal receiving step for receiving a service request signal from a user, a transmitting step for transmitting music related information from a base station of a mobile telephone network in a predetermined cell of the service request signal, and an audio signal generating step for generating an audio signal from the music related information at a subscribers side.

According to a sixth aspect of the present invention, a car apparatus includes a first position measuring means for position measuring a first position by receiving a radio wave from a GPS satellite, a second position measuring means for position measuring a second position by receiving a radio wave from a base station of a cellar telephone system without transmitting any request signal for position measuring to the base station, an evaluating means for evaluating uncertainty in data derived from the first position measuring means and/or the second position measuring means, a selecting means for selecting data from the first position measuring means or the second position measuring means based on an output signal from the evaluating means, a data storage means for storing map data, a display signal generating means for generating a display signal by combining an output signal from the selecting means and an output data from the data storage means, and a display means for displaying the display signal.

According to a seventh aspect of the present invention, an audio signal transmitting method for transmitting an audio signal with a first priority and an audio signal with an n-the priority (n is an integer equal to or greater than 2.) includes a transmitting step for transmitting the audio signal in a predetermined order with a priority corresponding to the priority of the audio signal to be transmitted.

DESCRIPTION OF THE PREFERRED EMBODIMENTS

Embodiments of the present invention will hereinafter be described with reference to the accompanying drawings.

First, prior to explaining a specific configuration of the present invention, explanation will be given of a position measuring system to which the present invention is applied. In the present invention, position measuring is performed by a position measuring system utilizing an artificial satellite system called a GPS, while position measuring is performed using a simplified mobile telephone system called a PHS (Personal Handyphone System).

Figure 2:
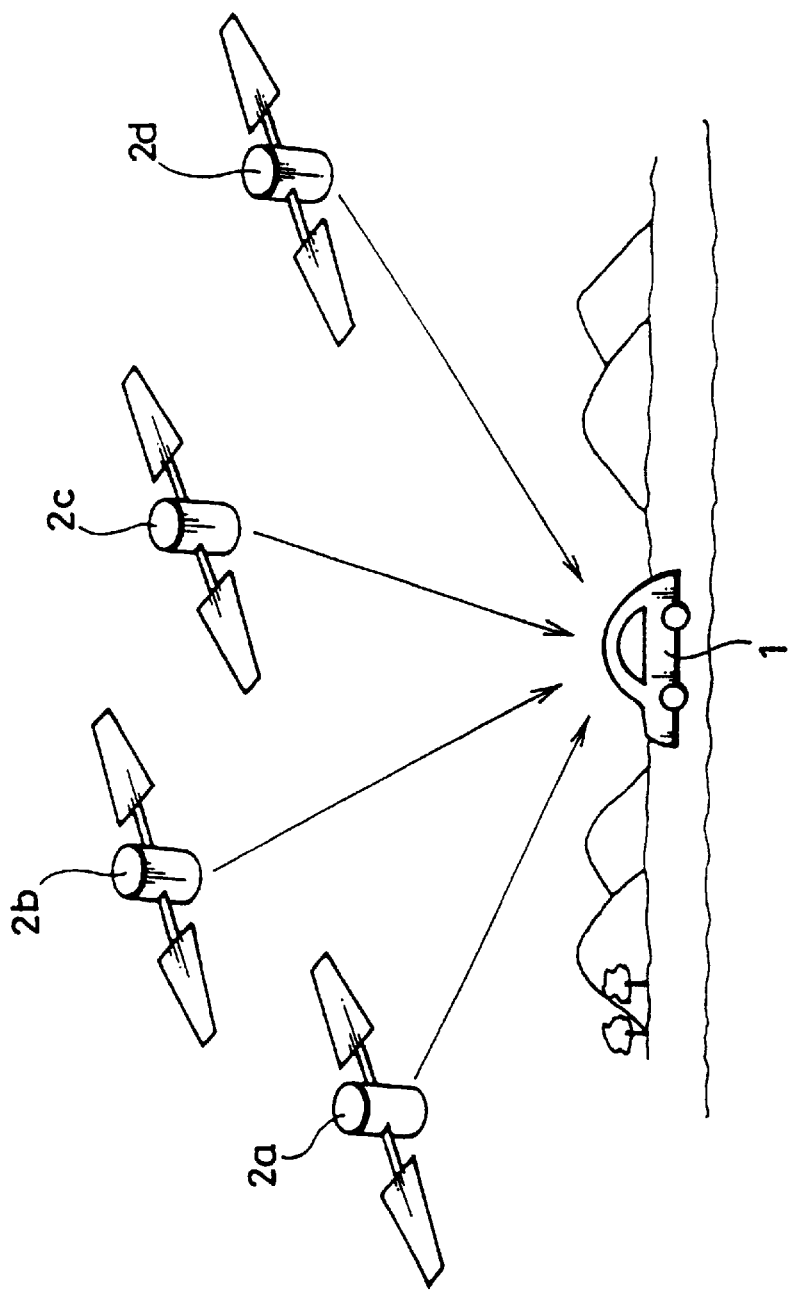
FIG. 2 is an explanatory diagram illustrating a position measuring condition using the GPS in a suburb.

FIG. 2 is a diagram illustrating a situation of a position measuring operation at a location where a GPS wave readily reaches, such as a suburb or the like. There are shown an automotive vehicle or car 1 with a user therein, and GPS satellites 2a–2d, respectively. In this state, since radio waves from the four GPS satellites 2a–2d readily and favorably reach the location of the user, position measuring at that location can be satisfactorily carried out with data on three axis x, y, z and a time axis t provided from the four satellites 2a–2d.

Figure 3:
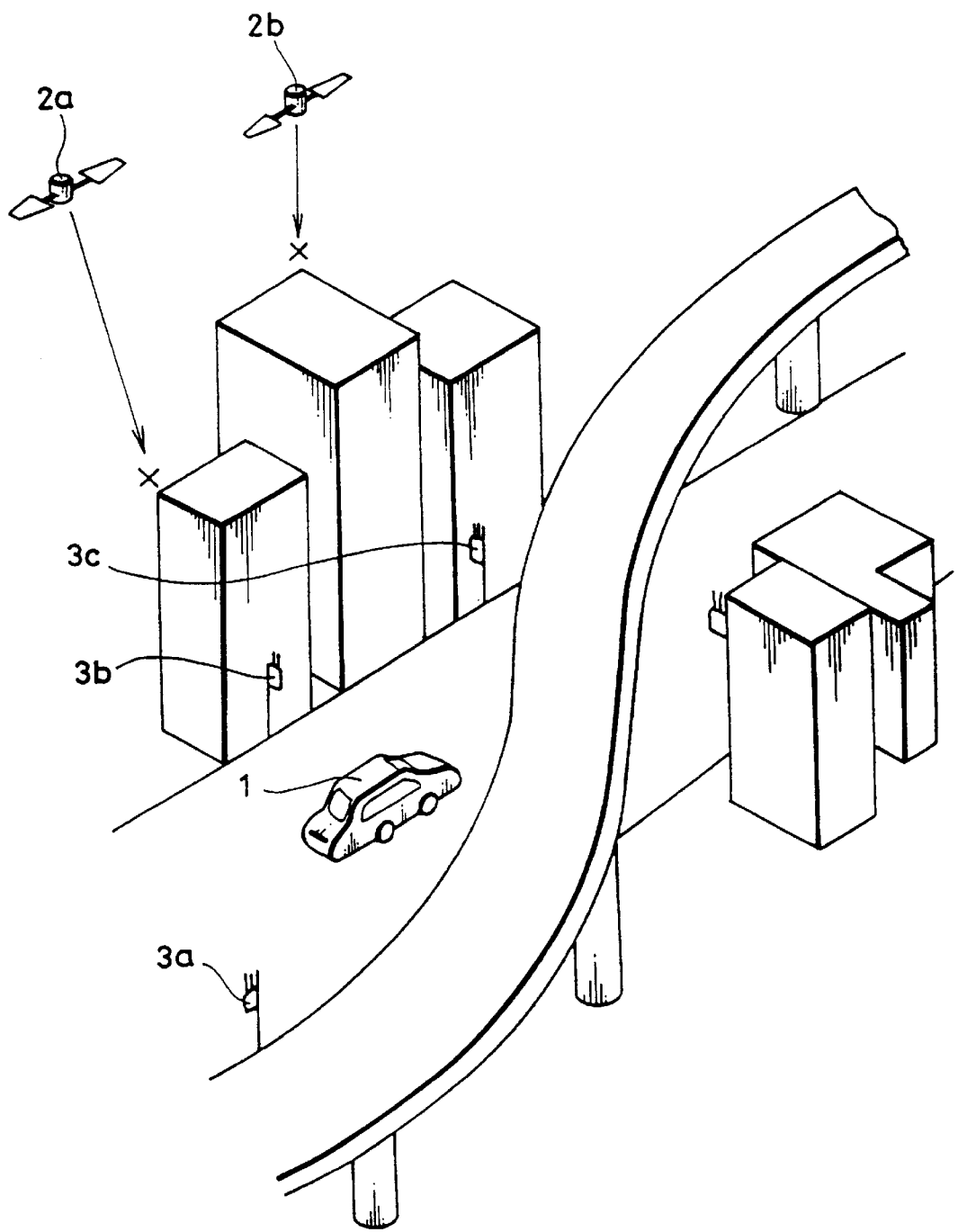
FIG. 3 is an explanatory diagram illustrating a radio wave receiving situation in a city.

FIG. 3 is a diagram illustrating a situation of radio waves in an urban area, where radio waves from the GPS satellites 2a, 2b, and so on are blocked by tall buildings and highway, built above the ground or the like, so that they never reach the location of the user or automobile 1. However, in recent years, a simplified mobile telephone system adopting a digital cordless telephone system has been gradually constructed in urban areas. In Japan, such a system is called the PHS, as mentioned above. In the United States, in turn, a similar system called personal communication services (PCS) exists, and similar systems called CT2, DECT, and so on also exist in Europe.

Explaining below the PHS in Japan, PHS base stations 3a–3c illustrated in FIG. 3 are installed at intervals of about 100 meters and each form a cell of a narrow range. Further, due to the nature of the PHS, if line capacity becomes insufficient due to excessive calls on the line in an urban area, this problem can be immediately solved by fragmenting the cell. In this event, since narrower cells are formed, it can be thought that separate cells be positioned, for example, at intervals of 10 meters. While PHS base stations have been positioned closely in urban areas, few have been installed in suburban areas.

Figure 4:
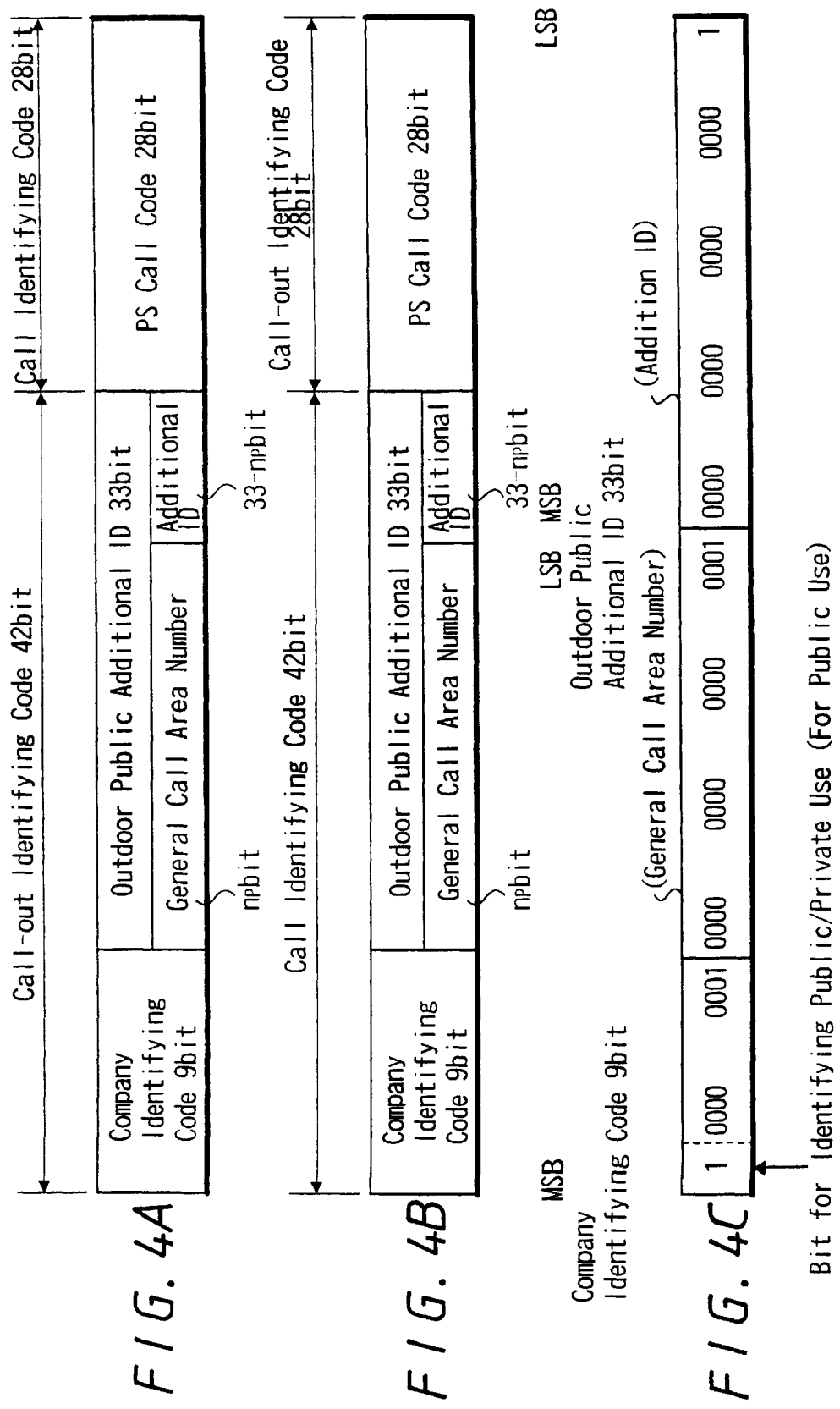
FIGS. 4A to 4C are explanatory diagrams illustrating formats for an ID signal of a PHS base station.

Incidentally, a PHS base station transmits an ID signal indicative of its own position and so on. FIG. 4A illustrates that ID signal, where CS represents a PHS base station, and PS represents a PHS terminal. Specifically, a company identifying code of 9 bits is transmitted first. Subsequently, an outdoor public additional ID of 33 bats is transmitted, wherein a general call area number of no bits is first transmitted, and then an additional ID of the remaining 33-np bits is transmitted. Further, a PS call code of 28 bits is transmitted to call a particular terminal. FIG. 4B illustrates a code transmitted from a PHS terminal to a PHS base station, as opposed to the above, wherein the company identifying code, the outdoor public additional ID, and the PS call code are similarly transmitted in the same format but in an opposite identification relationship between transmission and reception. FIG. 4C enlarges a portion of the codes, where the above-mentioned np is 16. Specifically, an exchange unit in a ground public network is specified with the general call area number, and a particular PHS base station is specified with the additional ID.

Since such signals are communicated, a base station, from which the signals have been transmitted, can be specified on a receiving terminal side by reading the 33-bits outdoor public additional ID. Further, if longitudes, latitudes, and so on indicative of the positions of individual base stations have previously been stored, the latitude and the longitude of each base station can be known. Further, it is also possible to directly transmit actual latitude and longitude informations from a base station as well as the above-mentioned additional ID.

A technique applying such an idea is found in Japanese patent publication No. 8-18501. This document exactly describes a technique for performing position measuring using the PHS. Also, Japanese patent publication No. 6-311093 describes a technique for detecting the position of a previously installed portable telephone base station to identify its own current position.

The above-mentioned techniques, however, have drawbacks. Specifically, since Japanese patent publication No. 8-18501 performs the position measuring using PHS base Rotations, the position measuring cannot be performed in suburban areas where no PHS base stations have been installed. As to Japanese patent publication No. 6-311093, in turn, since a portable telephone base station transmits a radio wave of high power at a low frequency, a sufficient accuracy cannot be ensured in specifying a position.

In addition, a technique for performing position measuring based on both GPS position measuring and the positions of cellular base stations is shown in Japanese patent publication No. 6-148308. However, this technique has poor position accuracy due to the use of portable telephone base stations, and moreover, a transmission request must be issued from a terminal side every time the position measuring is to be performed.

Figure 1:
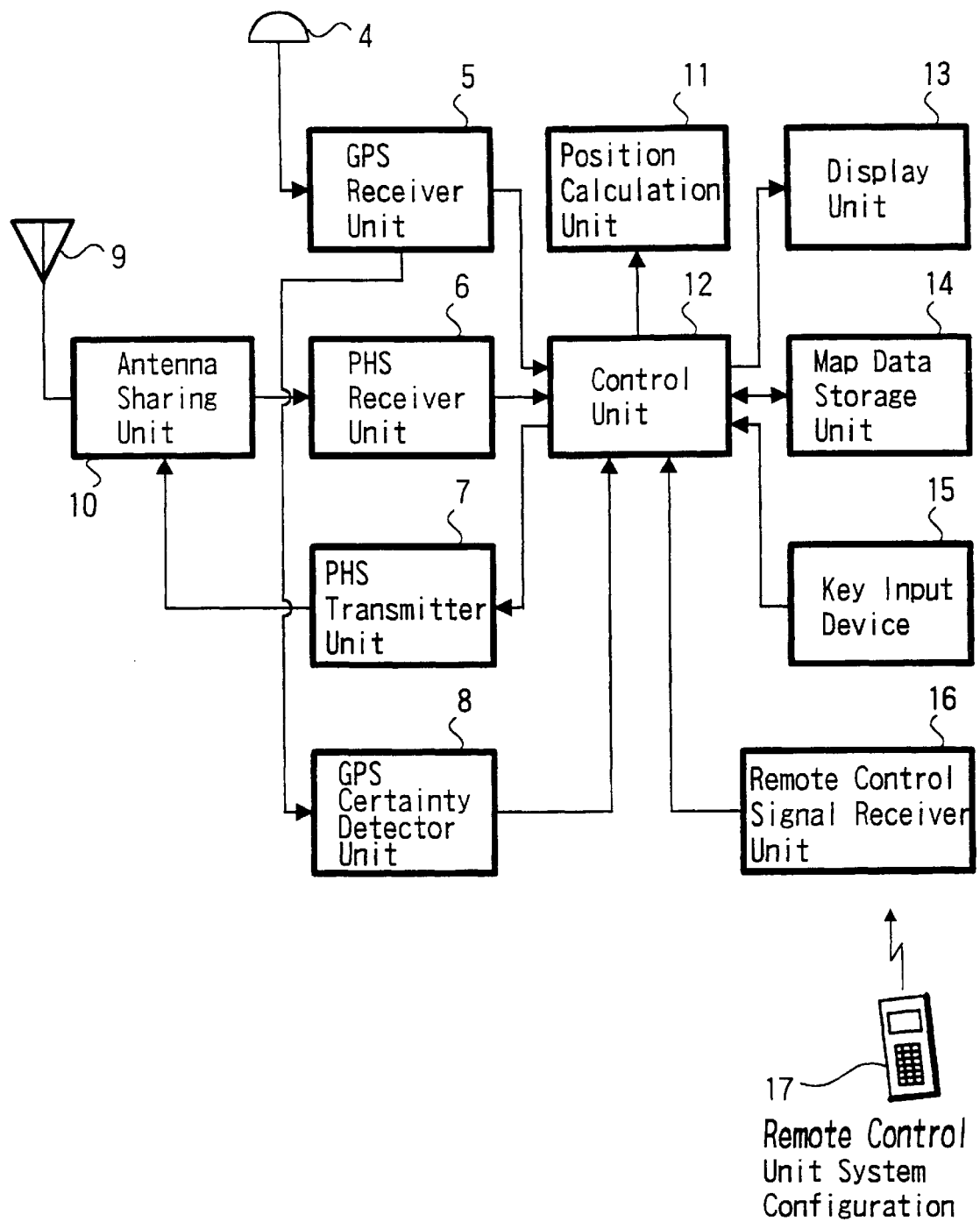
FIG. 1 is a block diagram illustrating the configuration of a navigation apparatus of one embodiment according to the present invention.

The present invention is intended to solve problems of these previously proposed techniques, and solution of the problems is achieved by an apparatus having the configuration illustrated in FIG. 1. Explaining below the configuration thereof, a GPS receiver unit 5 connected to a GPS antenna 4 receives a GPS signal from a GPS artificial satellite and decodes position data. A PHS antenna 9 for transmitting and receiving a PHS radio wave to and from a PHS base station is also connected to a PHS receiver unit 6 and a PHS transmitter unit through an antenna sharing unit 10. The PHS receiver unit 6 performs reception processing for extracting position data of a base station from a PHS signal received by the antenna 9. The PHS transmitter unit 7, in turn, performs transmission processing for a variety of information and transmits the information from the antenna 9 to a base station (note that the transmitter unit 7 may be omitted).

The GPS receiver unit 5 is connected to a GPS certainty detector unit 8 which detects the certainty of a received GPS signal. Specifically, the GPS signal has a coefficient signal called a GDOP signal (Geometrical Dilution Of Precision signal), added thereto, for indicating geometrical accuracy deterioration, and the processing for detecting the certainty of the GPS signal is performed by the detector unit 8 on the basis of this GDOP signal.

A signal received by the GPS receiver unit 5, a signal received by the PHS receiver unit 6, and a signal related to the certainty detected by the GPS certainty detector unit 8 are supplied to a control unit 12, serving as a system controller of the apparatus, For coordinating a variety of informations supplied thereto. The control unit 12 cs connected with a position calculation unit 11 which generates a specific position from the respective received signals such as latitude and longitude data. Alternatively, data indicative of a position such as a sheet number of a map may be generated in place of the latitude and longitude data. In this case, if a signal for position measuring is available from only one of the GPS receiver unit 5 and the PHS receiver unit 6, a position is calculated based on that signal. On the other hand, when signals are available from both of them, a signal to be used is selected with reference to the certainty detected by the GPS certainty detector unit 8. More specifically, if the certainty of the position measuring using,a the GPS, detected by the GPS certainty detector unit 8 is low, the ID of a base station received by the PHS receiver unit 6 is used to determine the position at which the base station exists, and the determined position is treated as the position derived by the position measuring. If the certainty is high, a position measured signal by the GPS is used to calculate the position. Incidentally, if data received by the PHS receiver unit 6 includes map data and traffic information, the data is stored in a map data storage unit 14 or the like.

The control unit 12 is also connected with a display unit 13 comprising a liquid crystal display unit or the like, on which displayed are a map image generated by map data read from the map data storage unit 14 and the position of the automotive vehicle itself calculated by the position calculation unit 11. For the map data storage unit 14, a large capacity storage means such as a CD-ROM drive or the like may be used. In this case, in this embodiment, absolute positional information on PHS base stations is stored together with base station As in addition to the map information on roads and so on.

Furthermore, the control unit 12 is connected with a key input device 15 and a remote control signal receiver unit 16, so that a variety of commands may be input from keys provided as the key input device 15 and a separate remote control unit 17 through a remote control signal (electric wave signals and infrared-ray signals).

Figure 18:
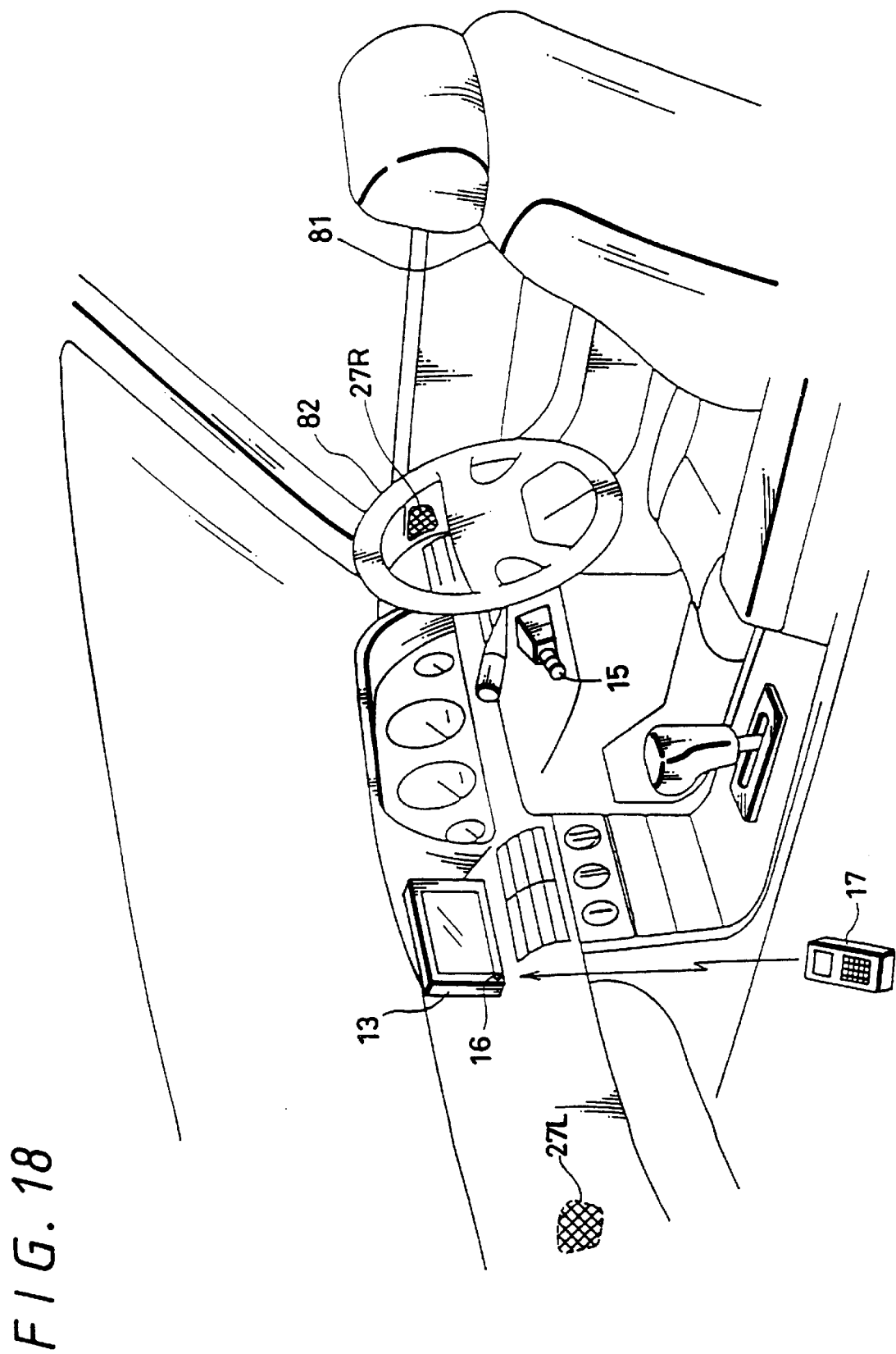
FIG. 18 is a perspective view illustrating an example of arrangement of an a navigation apparatus in an automobile according to one embodiment.
Figure 19:
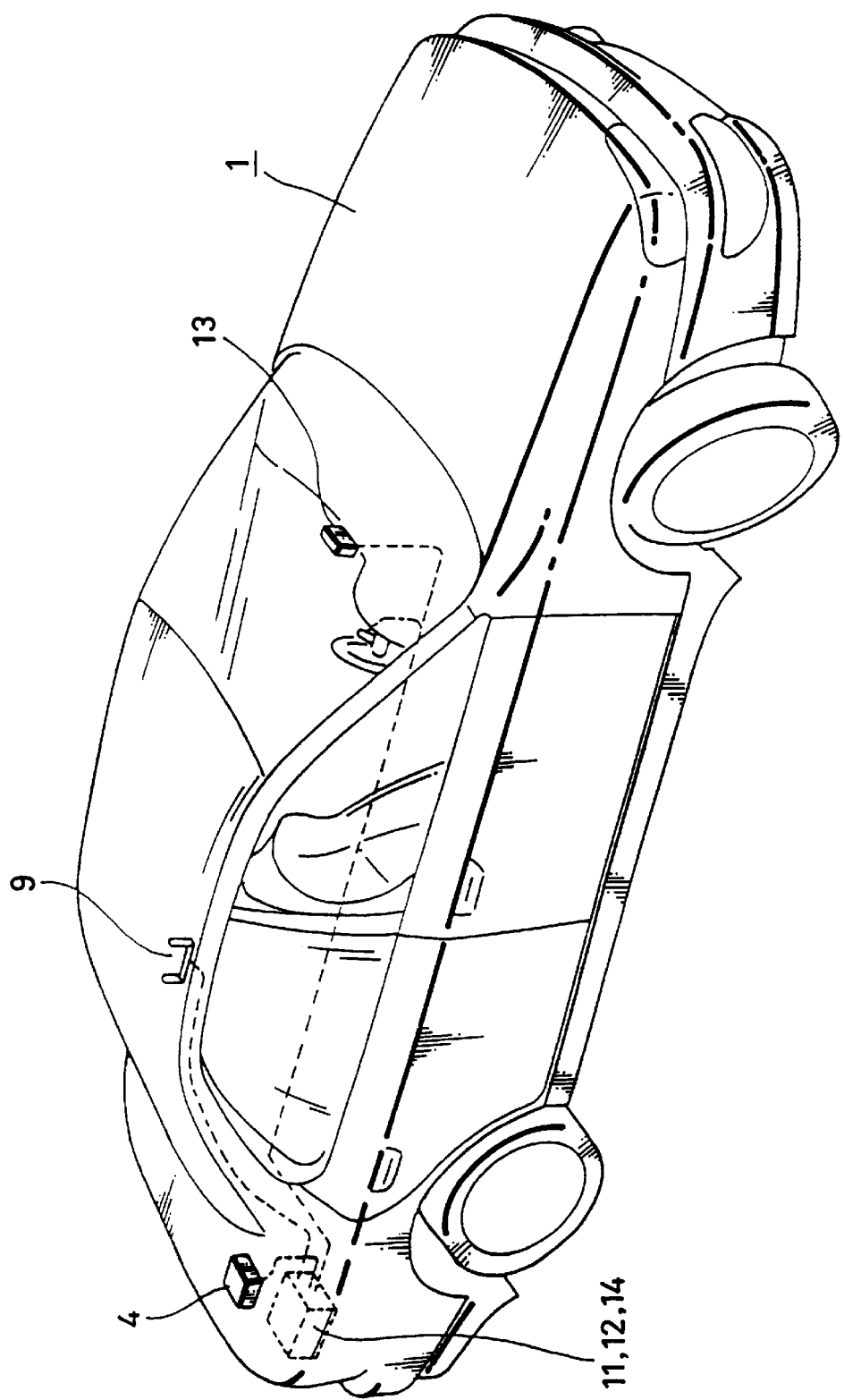
FIG. 19 is a perspective view illustrating an example of arrangement of a navigation apparatus on an automobile according to one embodiment.

The foregoing navigation apparatus of the configuration illustrated in FIG. 1 is arranged in the automotive vehicle 1, for example, as illustrated in FIG. 18 and FIG. 19. More specifically, as illustrated in FIG. 19, the body of the apparatus comprising the position calculation unit 11, the control unit 12, the map data storage unit 14, and so on is disposed at a predetermined position in an automotive vehicle 1, such as within its trunk or the like, and the GPS antenna 4 and the PHS antenna 9 are attached at corresponding positions on the vehicle body. Then, as illustrated in FIG. 18, the display unit 13 comprising a liquid crystal display unit or the like is positioned in front of a driver's seat 81 of the automotive vehicle such that a driver, when seated at the driver's seat 81, can view a display on the display unit 13. In this case, the liquid crystal display unit constituting the display unit 13 is also provided with the remote control signal receiver unit 16 so as to receive infrared ray signals from the remote control unit 17. Further, the key input device 15 comprising a joy stick or the like is mounted beside a steering wheel 82. Furthermore, speaker units 27L, 27R for outputting audio signals generated from received radio broadcast and audio signals from a CD player or the like (both not shown) are disposed at predetermined positions, such as positions in front of left and right doors. A microphone (microphone 58, later described) required as a telephone set may also be disposed on the display unit 13 or the like. It goes without saying that FIG. 18 and FIG. 19 illustrate an exemplary arrangement and such components may be mounted at any other position within the automotive vehicle 1.

Figure 5:
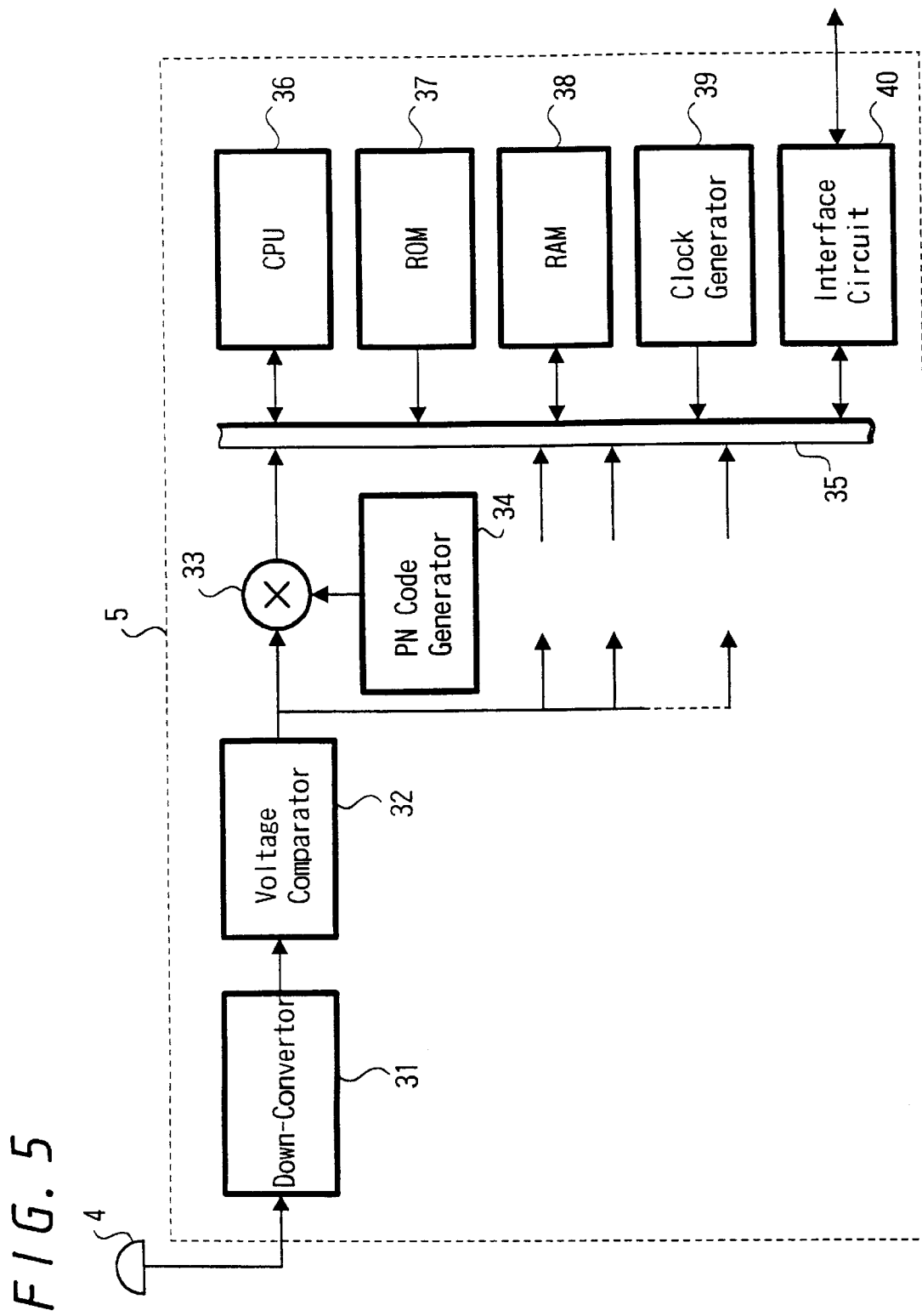
FIG. 5 is a block diagram illustrating a GPS receiver unit of one embodiment.

Next, the configuration of the GPS receiver unit 5 is explained with reference to FIG. 5. The GPS antenna 4 is connected to a down-convertor 31 for converting a signal at 1.57542 GHz from a GPS satellite into an intermediate frequency signal, and this intermediate frequency signal is supplied to a voltage comparator 32 for removing an analog noise included in the received signal. Then, a received signal output by this voltage comparator 32 is supplied to a multiplier 33 which multiplies the received signal by a C/A code PN code output by a PN code generator 34 corresponding to a C/A code of a GPS to perform reverse spreading for a GPS signal transmitted as a spread spectrum signal to decode desired GPS data. Incidentally, a plurality of channels of the multiplier 33 and the C/A code PN code generator 34 are provided such that GPS data from a plurality of satellites can be decoded at the same time.

Then, decoded data on the respective channels are sent onto a bus line 35. This bus line 35 is connected with a central control unit (CPU) 36 for controlling the operation of the GPS receiver unit, with a ROM 37 having a decoding operation program stored therein, with a RAM 38 for temporarily storing data upon decoding or the like, with a clock generator 39 for generating a clock for operations of respective circuits, and with an interface circuit 40, wherein decoding as the GPS is performed from decoded data on the respective channels based on the control of the central control unit 36 to produce position measured data. Then, the produced position measured data is supplied to the control unit 12 (see FIG. 1) side connected through the interface circuit 40. Incidentally, the GPS receiver unit 5 may utilize a card type one having all GPS functions configured on a small-size substrate as a GPS receiver board.

Next, the PHS receiver unit, the PHS transmitter unit, and their peripheral configuration will be explained with reference to FIG. 6. Explaining first the reception system, a signal received by the antenna 9 is supplied to a reception amplifier 41 through the antenna sharing unit 10 comprising a switch or the like, and an output of this reception amplifier 41 is supplied to a mixer 43 through a high frequency filter (RF filter) 42. This mixer 43 is supplied with a frequency signal generated by a frequency synthesizer 44 corresponding to a transmission/reception frequency (here, transmission and reception frequencies are the same and allocated a ⅛ GHZ band) based on an oscillating output of a temperature compensated type quartz oscillator (TCXO) 45. The received signal and this frequency signal are mixed in the mixer 43 to produce a first intermediate frequency signal. Then, this first intermediate frequency signal is supplied through a first intermediate frequency signal filter 46 and an amplifier 47 to a mixer 48, where mixing of the first intermediate frequency signal with a frequency signal outputted from an oscillator 49 produces a second intermediate frequency signal. Then, this second intermediate frequency signal is supplied to a demodulator circuit 52 through an amplifier 51 to perform demodulation based on a transmission scheme.

Here, a transmission signal of the PHS conforms to a scheme called a TDMA scheme (Time Division Multiple Access scheme which transmits and receives burst data composed of slots in a time division manner. A demodulated signal is supplied to a time-division multiplex circuit 53 for extracting audio data and control data included in predetermined slots. Then, the extracted audio data is supplied to an audio processing unit 54 for performing processing to convert the audio data into an analog audio signal, and the produced analog audio signal is output from a speaker 55. Also, the extracted control data is supplied to a data processing unit 56. In this data processing unit 56, an ID signal of a PHS base station or a variety of service signals, later described, and so on are extracted from the received control data, and supplied to the control unit 12 (see FIG. 1) from a data output terminal 57.

As the configuration for the transmission system, an audio signal picked up by a microphone 58 is supplied to the audio processing unit 54 to be converted into digital audio data, and this audio data is supplied to the time division multiplex circuit 53, and the audio data is placed in a predetermined position in transmission slots. Also, data supplied from the control unit 12 is supplied to the data processing unit 56 through a data input terminal 59, and the data subjected to the transmission processing is supplied to the time division multiplex circuit 53 and placed in a predetermined position in the transmission slots.

Then, burst data configured as transmission slots, generated by the time division multiplex circuit 53 is supplied to a modulator circuit 60 for performing modulation processing for the PHS, and a modulated signal is supplied to a mixer 61. In this mixer 61, the modulated signal is mixed with a frequency signal output from the frequency synthesizer 44 to produce a signal with a transmitting frequency, and this transmission signal, through a high frequency filter 62 and a transmission amplifier 63, is transmitted in wireless fashion from the antenna 9 connected to the antenna sharing unit 10 to a PHS base station.

Figure 6:
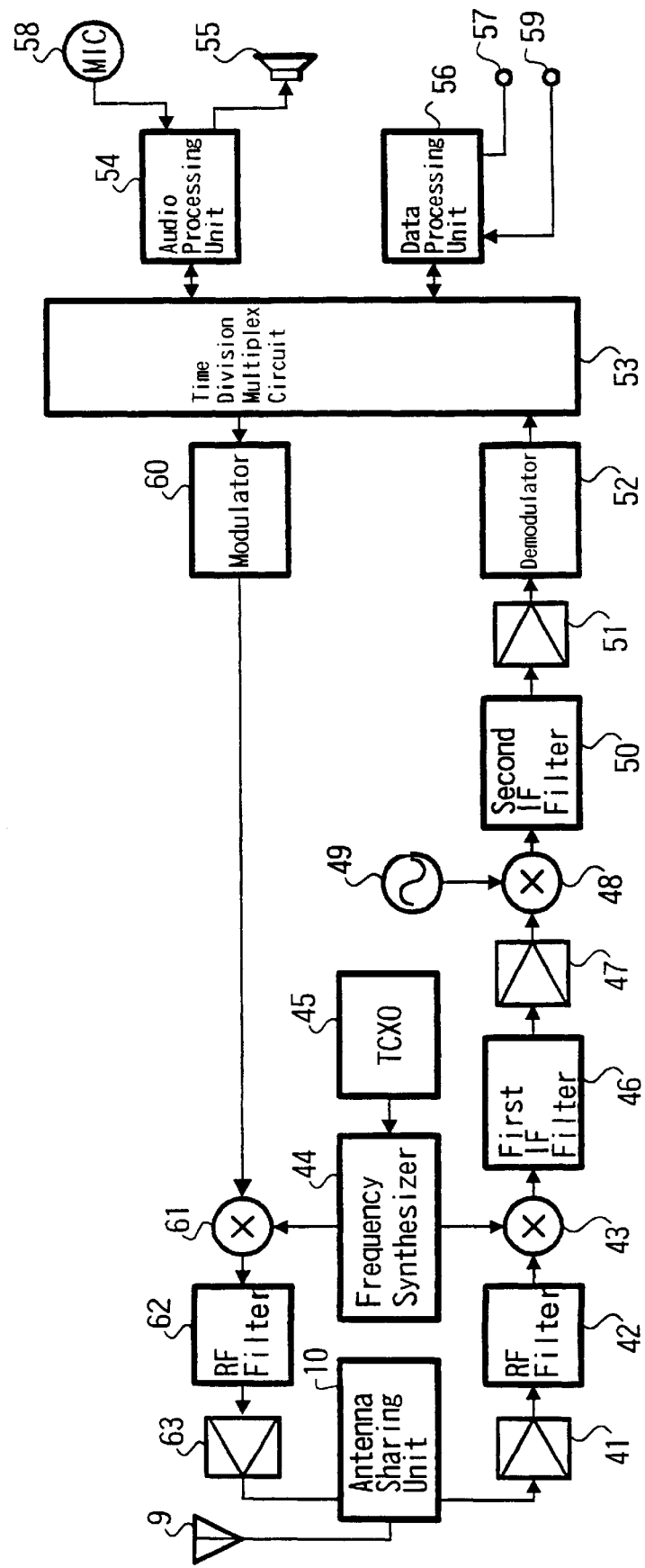
FIG. 6 is a block diagram illustrating a PHS receiver unit/transmitter unit of one embodiment.
Figure 7:
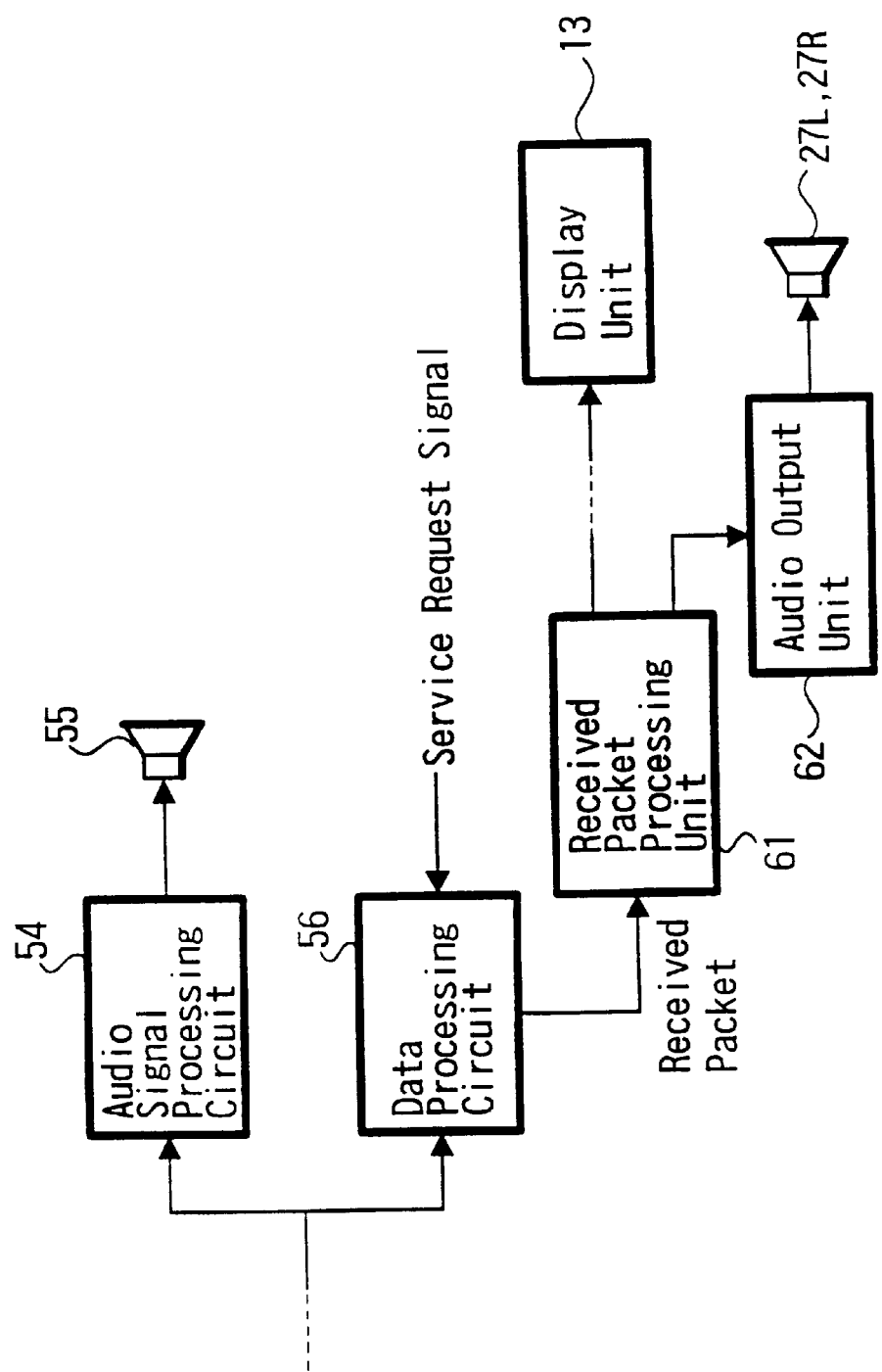
FIG. 7 is a block diagram illustrating a data receiver unit and peripheral units of one embodiment.

Now, explaining a configuration connected to the data processing unit 56 of the PHS terminal illustrated in FIG. 6 with reference to FIG. 7, the data processing unit 55 is supplied with data such as a service request signal or the like from the control unit 12. Also, received packet data received by this terminal from a base station and supplied to the data processing unit 56 is supplied to a received packet processing unit 61. Then, data for display within this received packet is supplied to the display unit 13 through the control unit 12 and displayed thereon. Also, audio data within the received packet data is supplied to an audio output unit 62, subjected to audio output processing therein, and output from the left and right speakers 27L, 27R. Incidentally, a service signal transmitted from the base station side may be transmitted, for example, using a free portion within a control channel (slot), or using a channel (slot) prepared for transmitting communication signals.

Figure 8:
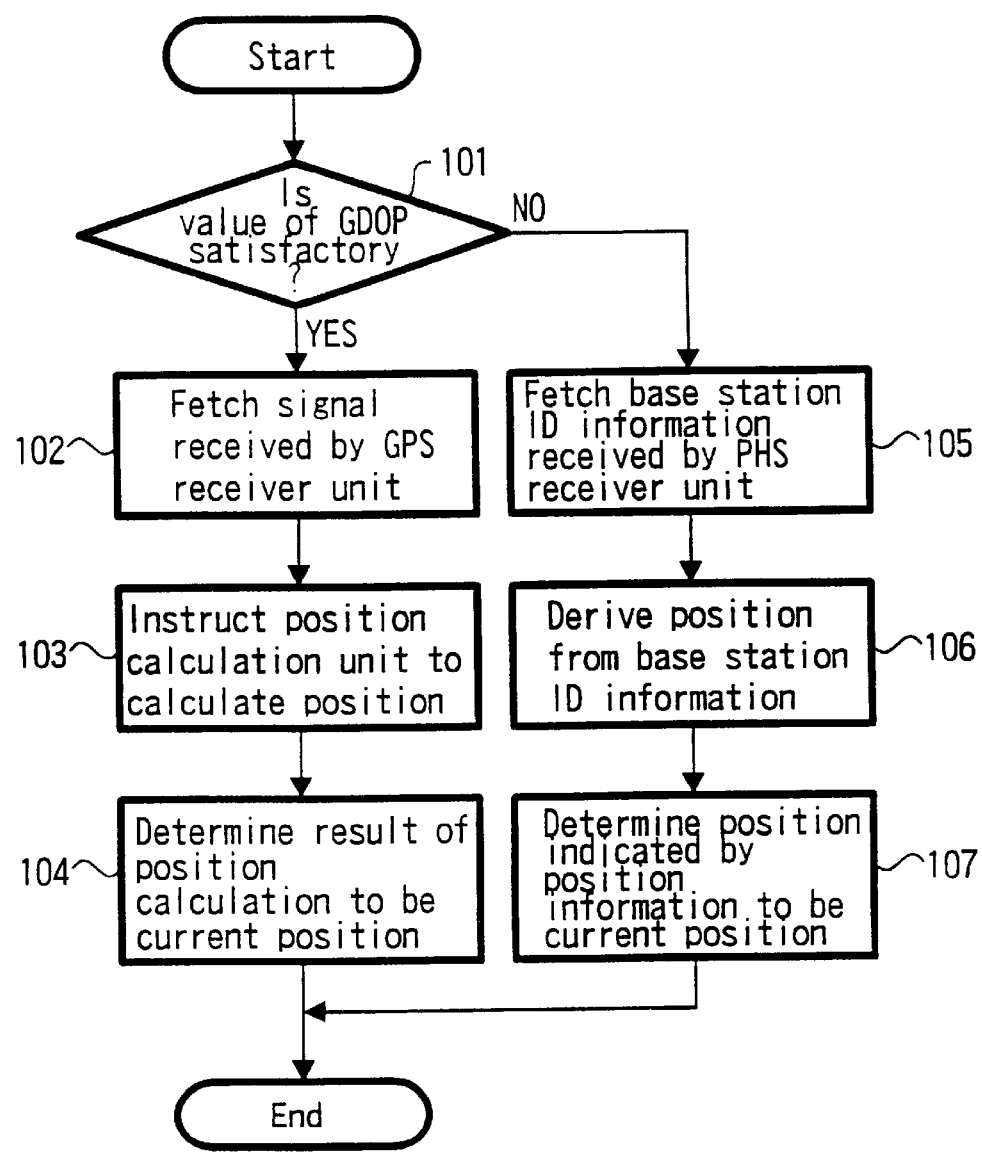
FIG. 8 is a flowchart illustrating position determination processing according to one embodiment.

Next, determination processing in the control unit 12 of the apparatus of this embodiment when position of the automotive vehicle 1 equipped with the apparatus is measured will be explained with reference to a flow chart of FIG. 8.

First, the value of GDOP is evaluated on the basis of detection in the GPS certainty detector unit 8 to judge whether or not it is within a predetermined range (step 101), and it is determined that a GPS receiving condition is satisfactory when it is within the predetermined range. When it is determined to be satisfactory, a signal received by the GPS receiver unit 5 is fetched (step 102), and a position calculation is executed in the position calculation unit 11 based on the fetched signal (step 103). Then, the calculated position is decided to be the current position of the automotive vehicle 1 (step 104).

Conversely, if it is determined at step 101 that the value of GDOP is not within the predetermined range, base station ID information received by the PHS receiver unit 6 is fetched (step 105). Then, the position is calculated in the position calculation unit 11 based on the base station ID (step 106). In this event, the position calculation is performed with reference to position data on each base station ID stored in the map data storage unit 14. Then, the calculated position is decided to be the current position of the automotive vehicle 1 (step 107).

Figure 9:
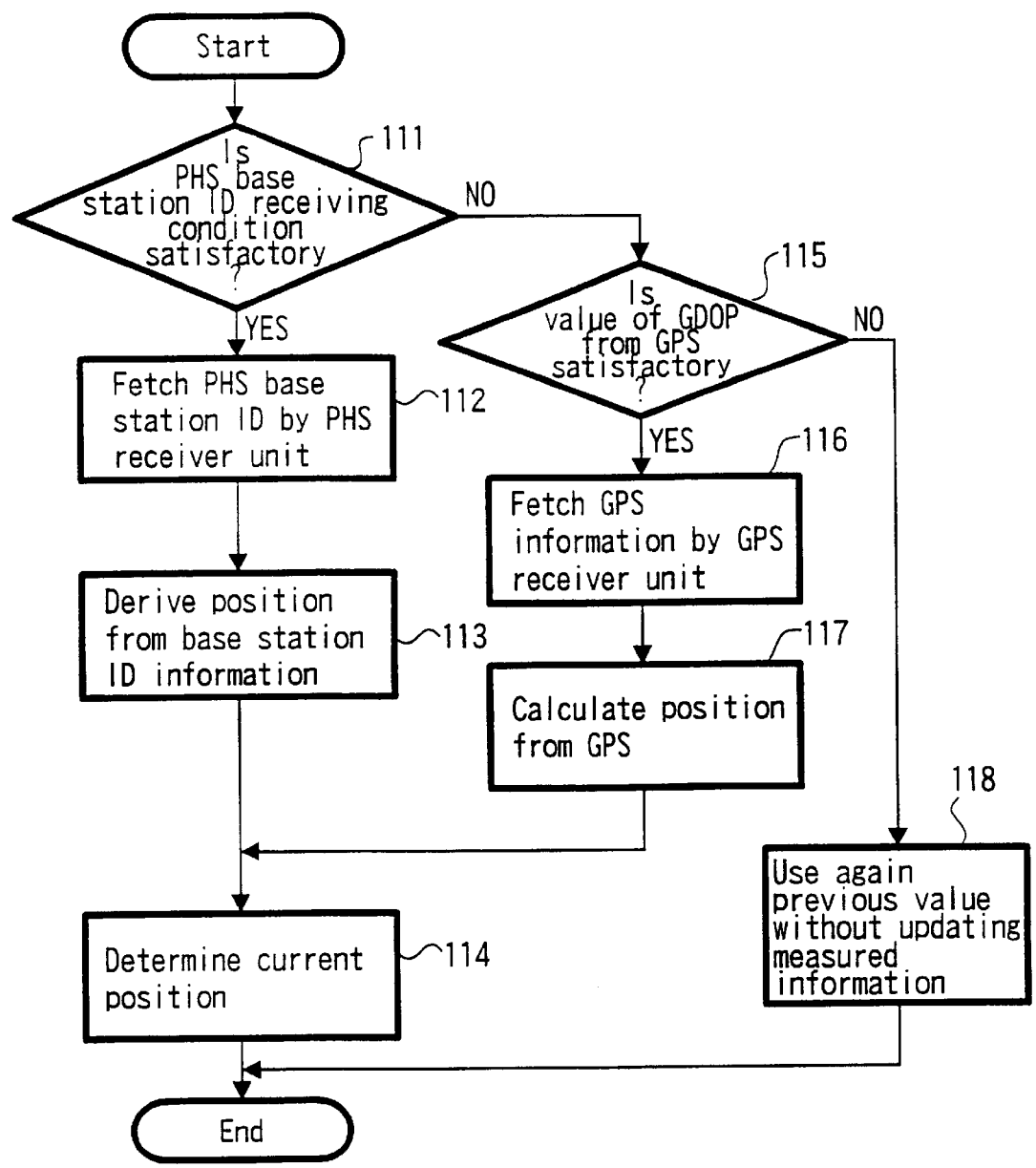
FIG. 9 is a flowchart illustrating position determination processing according to another embodiment.

Incidentally, the position determination processing may be executed in the processing illustrated in a flow chart of FIG. 9. In this example, the position measuring on the base station ID has priority to the position measuring on the GPS. It is first judged whether or not a PHS base station ID is satisfactorily received (step 111). Then, if received satisfactorily, the base station ID is fetched by the PHS receiver unit 6 (step 112). Then, the position is obtained from information on the base station ID (step 113), and the obtained position is decided to be the current position (step 114).

On the other hand, if it is judged at step 111 that the base station ID is not satisfactorily received, the value of GDOP is evaluated on the basis of detection in the GPS certainty detector unit 8 to judge whether or not the value is within a predetermined range (step 115), and it is determined that a receiving condition of the GPS is satisfactory if it is within the predetermined range. when it is determined to be satisfactory, a signal received by the GPS receiver unit is fetched (step 116), and a position calculation is executed in the position calculation unit 11 based on the fetched signal (step 117). Then, the calculated position is determined to be the current position of the automotive vehicle 1 (step 114).

Conversely, if it is judged at step 115 that the value of GDOP is not within the predetermined range, position measuring information is not updated, and the previously measured position is used again (step 118). Alternatively, instead of using the previously measured position as it is, the current position may be estimated from a position measuring history. Further, if no base station ID is received, the position measuring calculation may be executed even if the value of GDOP is not satisfactory. In this case, a poor position measuring accuracy may be notified by a display on the display unit 13 or the like when the value of GDOP is not satisfactory.

Figure 10:
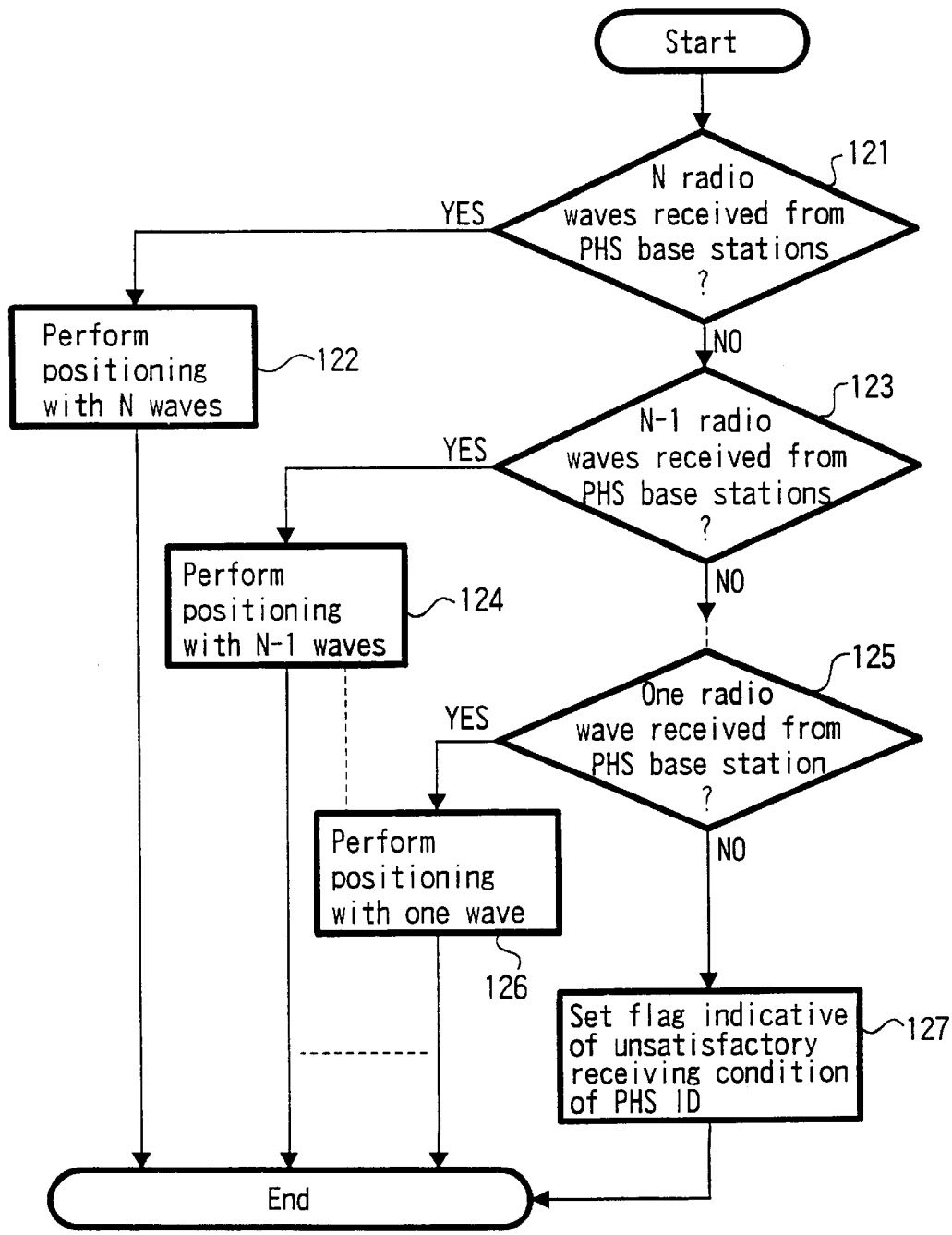
FIG. 10 is a flowchart illustrating position measuring processing using radio waves from base stations according to one embodiment.
Figure 11A:
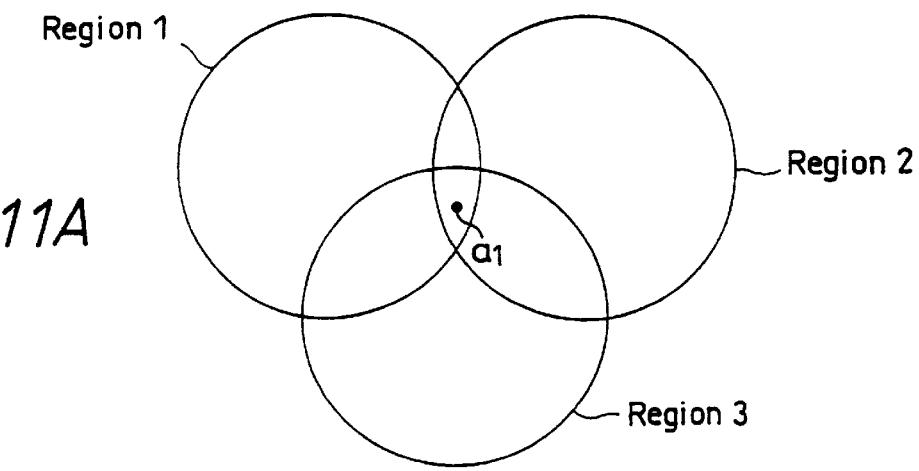
FIGS. 11A to 11C are explanatory diagrams illustrating position measuring conditions using radio waves from base stations according to one embodiment.

Next, the processing performed for the position calculation in the position calculation unit 11 based on the PHS base station ID, during the foregoing determinations of positions, will be explained with reference to a flow chart of FIG. 10 and a diagram of FIG. 11 for explaining a position measuring condition. In this embodiment, when ID's can be received from a plurality of base stations, accurate position measuring is performed on the basis of the plurality of base station ID's. Specifically, as illustrated in FIG. 11A, when radio waves from three base stations, for example, can be simultaneously received at a predetermined level or higher, three regions exist as regions 1, 2, 3 in which radio waves from the three base stations can be received, a region a1 in which the three regions 1, 2, 3 overlap can be identified, and the region 1a can be identified as the current position.

Figure 11B:
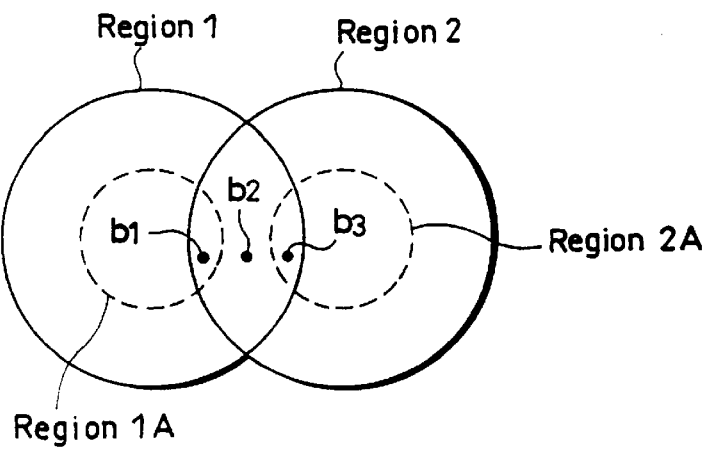

Similarly, when radio waves from two base stations can be received at the predetermined level or higher, the position can be identified to be in a region b2 in which regions 1, 2 overlap, as illustrated in FIG. 11B, where radio waves from the respective base stations can be received at the predetermined level or higher. In this case, when regions in which data on ID's transmitted from the respective base stations can be received and decoded at a predetermined error rate or less are regions 1A, 2A, for example, if either of the base station ID's can be decoded, the region b1 or b2 can be identified, thereby making it possible to more accurately identify the current position.

Further, when a radio wave from only one base station can be received at the predetermined level or higher, it can be identified to be a position within a region 1 determined by the base station. Furthermore, if the ID of the base station can be decoded at the predetermined error rate or less, the position can be identified to be within a region c1 in which the ID can be decoded at the predetermined error rate or less. If the ID cannot be decoded at the predetermined error rate or less, the position can be determined to be within the region 1 but out of the region c1 (for example, at a position where c2 or c3 exists).

In this embodiment, the processing is performed for identifying a position in accordance with the number of receivable radio waves of base stations. As illustrated in the flow chart of FIG. 10, it is first judged during the position calculation whether or not n waves (for example, three waves) from PHS base stations can be received at a predetermined level or higher at the same position (step 121). Here, if n waves can be received, position measuring is performed with the n waves (the position measuring illustrated in FIG. 11A if n is three, for example) (step 122). Then, if n waves cannot be received, it is judged whether or not n−1 waves (for example, two waves) can be received at the predetermined level or higher (step 123). Here, if n−1 waves can be received, the position measuring is performed with the n−1 waves (the position measuring illustrated in FIG. 11B if n−1 is two, for example) (step 124). Subsequently, the number of receivable radio waves is decreased gradually and judgement is made in a similar manner, and it is finally judged whether or not one wave can be received at the predetermined level or higher (step 125). Then, if one wave can be received, the position measuring is performed with the one wave (the position measuring illustrated in FIG. 11C) (step 126). Additionally, if even one wave cannot be received, a flag indicative of unsatisfactory ID receiving condition of a PHS base station is set in a memory for judging when executing the processing program judged by the control unit 12.

Figure 11C:
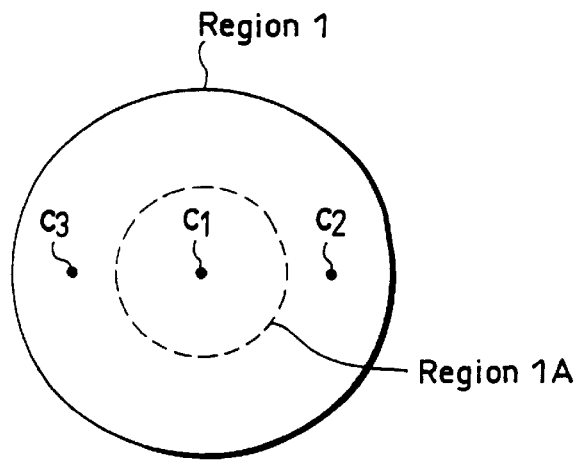

In this way, the position can be calculated from radio waves of PHS base stations. Alternatively, a current position may be estimated to some degree from a previous history. For example, if only one wave from a base station can be received, for example, as illustrated in FIG. 11C, when, after first determining the position c2 (this determination may be made on the GPS side), c1 is determined to be an area in which a base station ID can be decoded at the predetermined error rate or less, and subsequently the base station ID cannot be decoded at the predetermined error rate or less, the current position may be estimated to be the position c3.

Next, reception processing in the control unit 12 for a service signal transmitted from a PHS base station in the apparatus of this embodiment, will be explained with reference to a flow chart of FIG. 12 and display examples of FIG. 13–FIG. 16. First, as illustrated in the flow chart of FIG. 12, it is judged whether or not a data signal other than an audio signal exists within PHS received signals (step 131). Then, if no data signal other than the audio signal is found, the service signal reception processing is ended. Conversely, if any service signal is found, it is judged whether or not the signal is traffic information such as traffic jam information, closed street information, construction information, or the like (step 132). Here, if it is traffic information, a traffic information display operation is performed (step 133). As this display processing, pertinent traffic information 13b is displayed, for example, on the screen of the display unit 13 in the form of characters or the like, as illustrated in FIG. 13A. Alternatively, a traffic jam section 13a or the like demonstrated on a displayed road map. The demonstration of a traffic jam section in this case indicates that the currently forwarding direction only is in a jam. Alternatively, the display of traffic information in the form of characters and a map may be made only when a section indicated by the traffic information is in the forwarding direction, instead of all information being displayed any time on the display unit 13, when received.

Figure 12:
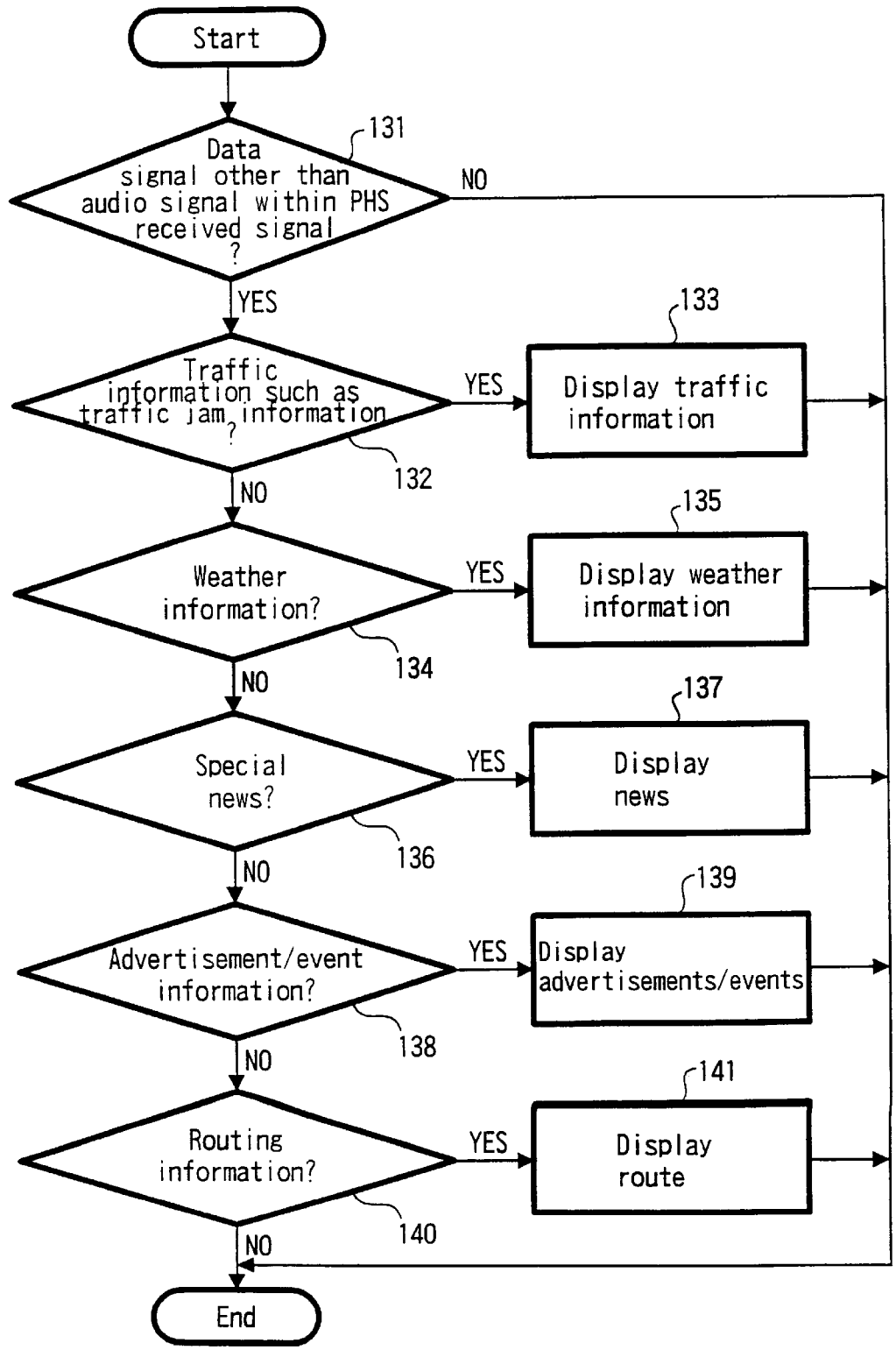
FIG. 12 is a flowchart illustrating display processing according to one embodiment.
Figure 13A:
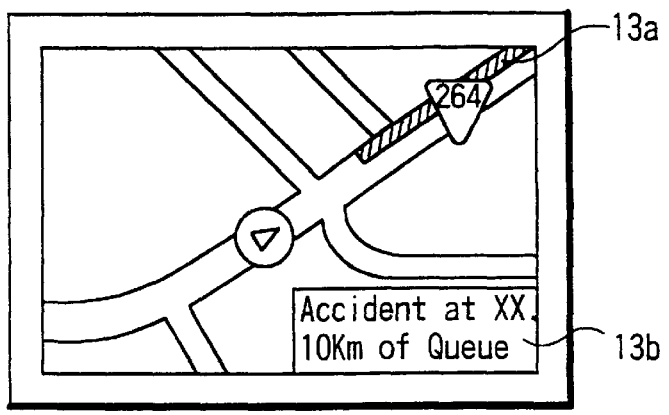
FIGS. 13A to 13D are explanatory diagrams illustrating display examples according to one embodiment.
Figure 13B:
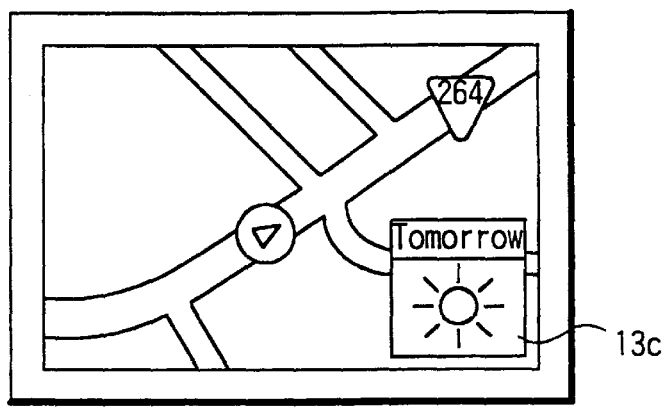

Turning back to the flow chart of FIG. 12, if it is determined at step 132 that the signal is not traffic information, it is next judged whether or not the signal is weather information (step 134). Here, if it is determined to be weather information, the weather information is displayed (step 135). As this display processing, weather forecast 13c or the like is displayed in a corner of a road map, as illustrated in FIG. 13B.

Figure 13C:
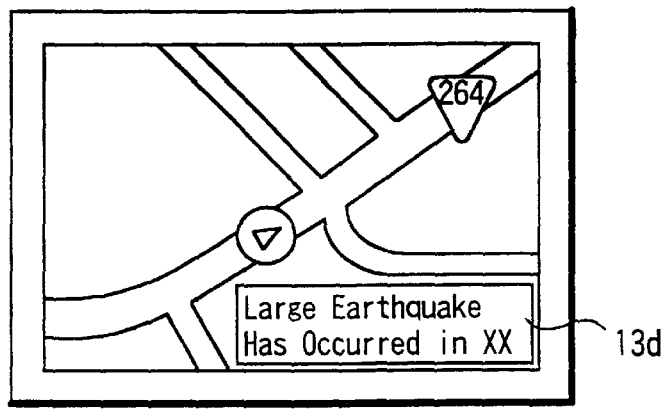

Conversely, if it is determined at step 134 that the signal is not weather information, it is next judged whether or not the signal is a special news (step 136). Here, if it is determined to be a special news, the received special news is displayed in the form of characters 13d or the like in a corner of the screen on which a map or the like is displayed, for example, as illustrated in FIG. 13C (step 137).

Figure 13D:
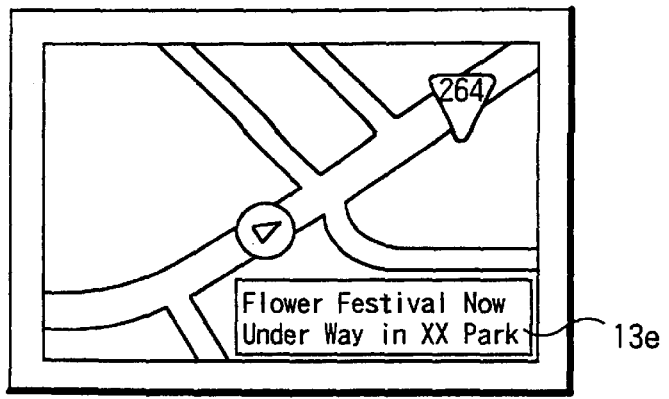

Conversely, if it is determined at step 136 that it is not a special news, it is next judged whether or not the signal is information such as advertisements, events, or the like (information on tourism, information on events at stores, and so on near the current position) (step 138). Here, if it is determined to be information such as advertisements, events or the like, associated information is displayed in the form of characters 13e in a corner of the screen on which a map or the like is displayed, for example, as illustrated in FIG. 13D (step 139).

Conversely, if it is determined at step 138 that it is not information such as advertisements, events, or the like, it is next judged whether or not the signal is routing information (step 140). Here, if it is routing information, processing such as displaying the route or the like is performed (step 141). Incidentally, this routing information is such that current position information and destination information, for example, are transmitted from the apparatus of this embodiment to a PHS base station side, a routing computation is performed on a traffic information center (not shown) connected to the base station side, and information on the computed route is returned to the apparatus using a channel of the PHS. In this way, appropriate routing information can be provided for avoiding traffic jam based on latest information.

Incidentally, if audio signals are provided instead of display signals as these service signals, the audio (a speech indicating a traffic jam section or the like) may be output from a speaker.

Figure 14:
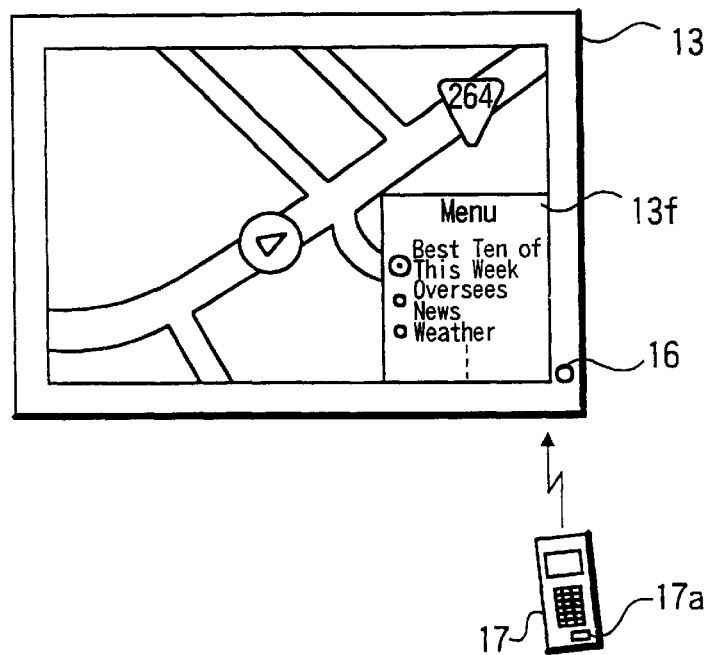
FIG. 14 is an explanatory diagram illustrating a display example according to one embodiment.

Alternatively, interactive communications may be performed for providing information in response to a request from the apparatus side so as to acquire necessary information. For example, as illustrated in FIG. 14, a menu screen 13f is displayed in a corner of a map or the like by a service signal transmitted from a base station side, and a remote control signal (infrared ray signal), serving as a selection signal, is transmitted from the remote control unit 17 to the receiver unit 16 by predetermined key manipulations on up and down selection keys, an enter key 17a and so on disposed on the remote control unit 17. Incidentally, an item selected within the menu screen 13f may be identified by giving it a different size or color from other items or by blinking the item. Then, a signal for selecting a predetermined item within the menu is transmitted from the transmitter unit 7 to the base station side through the transmission of the selection signal, and detailed data on the associated item is returned from the base station. Information provided in this way may be other information such as detailed news for supplementing the aforementioned special news, sport news, or the like.

Figure 15A:
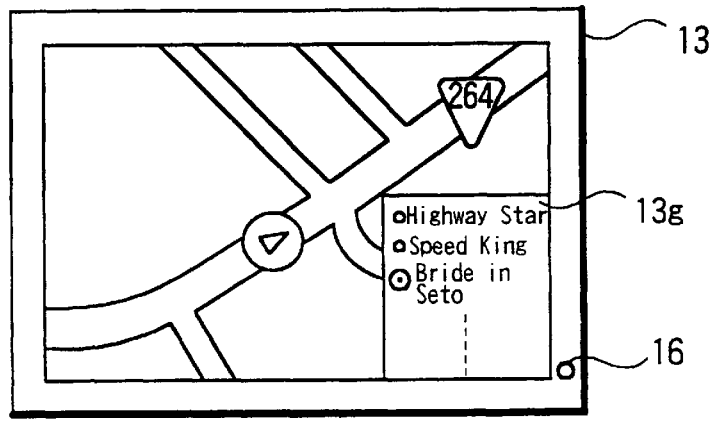
FIGS. 15A and 15B are explanatory diagrams illustrating display examples according to one embodiment.
Figure 15B:
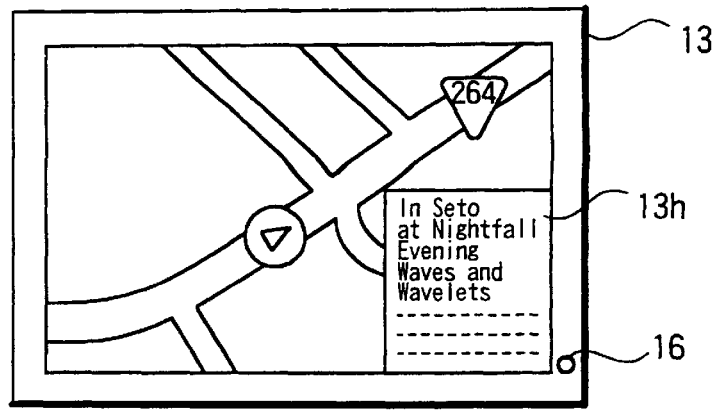

In addition, services related to music may also be provided in the interactive services as mentioned above. For example, an item displayed as "Best Ten of This Week" is selected on the menu screen as illustrated in FIG. 14, and information on titles of music of "Best Ten of This Week" is acquired as illustrated in FIG. 15A, and a display 13g of the information is provided. Then, by further selecting a title from the titles displayed, information on the selected music is received from the base station side, the music is outputted from speakers, and its text 13h is displayed within the screen as illustrated in FIG. 15B. In this event, the output from the speakers may be instrumental music called "karaoke" instead of the music including the song. Incidentally, the speakers for outputting the music are preferably implemented by high performance speakers for so-called high fidelity specification prepared for car stereo (left and right speakers 27L, 27R illustrated in FIG. 18 or the like) so as to reproduce the music in a good sound quality. In this way, this service may be utilized to always reproduce latest hit music only with menu manipulations, whereas conventionally, medias (compact discs and so on) must be purchased quite frequently for enjoying latest hit music, thereby requiring a huge cost, a large number of steps, and a depository.

Figure 16:
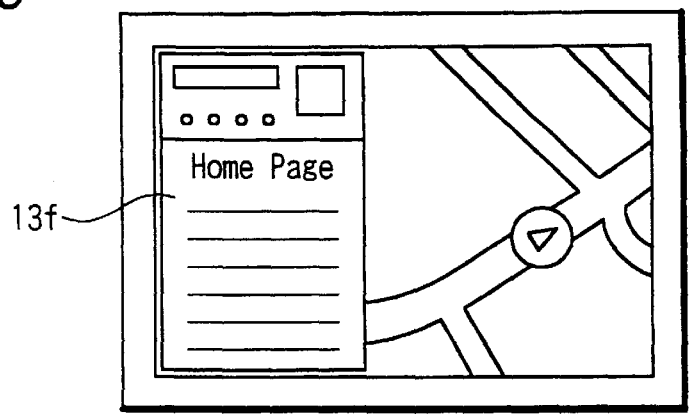
FIG. 16 is an explanatory diagram illustrating a display example according to one embodiment.

Alternatively, by interactive communications through a base station, so-called personal computer communications such as Internet or the like may be performed to display acquired information on the display unit 13 or the like. For example, as illustrated in FIG. 16, a predetermined computer communication center is linked by communications through a base station to display acquired image information 13i together with a road map or the like within the screen. Alternatively, in this case, the road map may be erased to display information such as Internet or the like over the entire screen.

Figure 17:
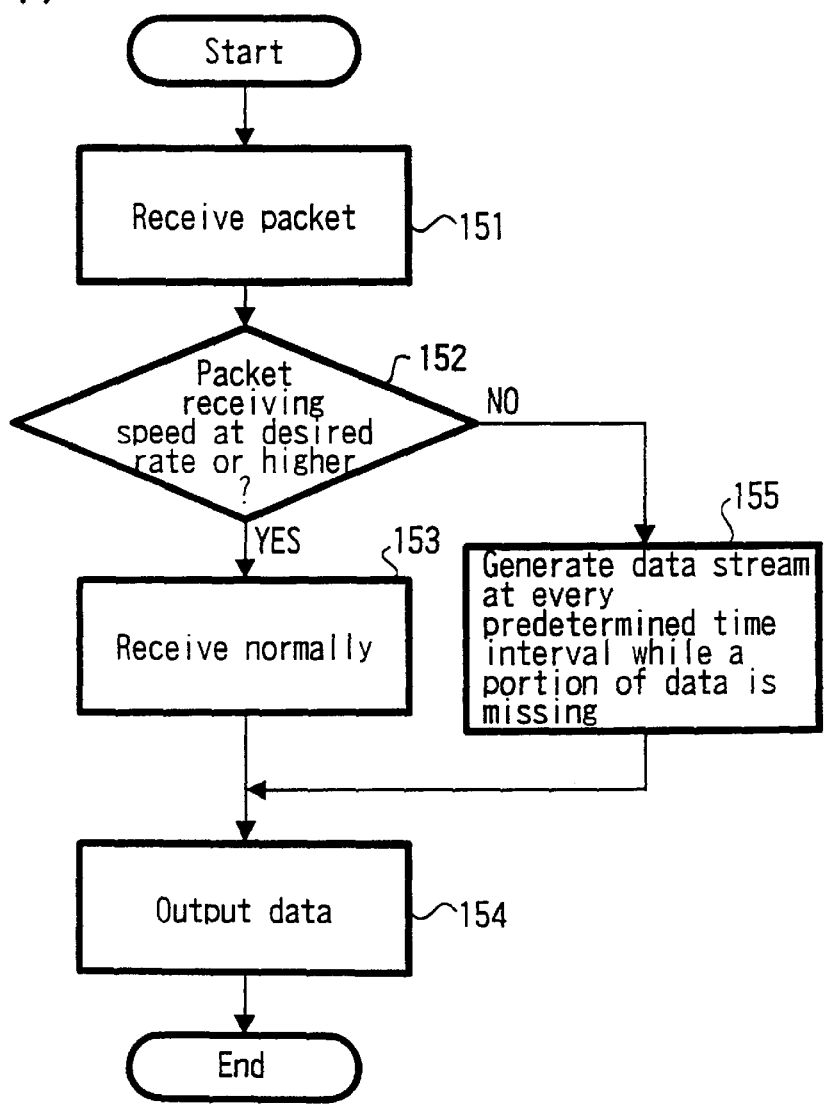
FIG. 17 is a flowchart illustrating data reception processing according to one embodiment.

Incidentally, when computer communications are performed such as Internet or the like, the transmission speed may be accidentally reduced due to a variety of causes. However, even in such a case, if data to be received is music data, the music can be transmitted without damaging its real time nature by generating a data stream while a portion of the data is missing. As the processing for this case, for example, as illustrated in FIG. 17, a packet is received (step 151), and it is judged whether or not a reception speed of the received packet is at a desired rate or higher (step 152). If it is at the desired rate or higher, communication reception processing is performed (step 153), and data output processing is performed (step 154). Conversely, if it is not at the desired rate or higher, a data stream is generated at every predetermined time while a portion of data is missing (step 155), and the data output processing may be performed for the generated stream.

By thus processing, the data transmission is divided, for example, into reproducing frequency bands of the music signal and its associated data (text data) as follows, and they are transmitted with a definite priority from the above in the following manner (1) to (7), thereby favorably reproducing the music:

(1) L+R component at 3 kHz or lower;

(2) L−R component at 3 kHz or lower;

(3) text data;

(4) L+R component in a range of 3 to 6 kHz;

(5) L−R component in a range of 3 to 6 kHz;

(6) L+R component in a range of 6 to 15 kHz; and (7) L−R component in a range of 6 to 15 kHz;

Incidentally, the L+R component is a signal (monaural component) having a component generated by synthesizing left and right signals of stereo music signals, and the L−R component is a difference signal between the left and right stereo music signals.

By thus transmitting the components with the definite priority, for example, the music can be reproduced in monaural with a minimum music quality when at least data of (1) can be received; stereo reproduction is available when data up to (2) can be received; the text can be displayed when data up to (3) can be received; and the reproduced music quality is gradually improved as data with lower priorities can be received. In this way, a so-called graceful degradation can be realized.

Incidentally, in the foregoing embodiment, the GPS is used as the position measuring using a signal received from a satellite and the PHS is used as a mobile telephone system, however, it goes without saying that other satellite position measuring system and mobile telephone system may also be applied.

According to the present invention, since both the position measuring by using satellites and the position measuring by using radio waves of mobile telephone base stations are performed, results of the position measuring by using satellites are used in a area such as a suburban area or the like where radio waves from satellites can be satisfactorily received, while results of the position measuring by using radio waves of cellular mobile telephone base stations are used in an urban area, a tunnel, or the like, whereby highly accurate position measuring can be achieved at any site.

Also, when the position measuring is performed by using radio waves from mobile telephone base stations, the position measuring with two waves from two stations, and the position measuring with three waves from three stations can be performed in addition to the position measuring with one wave from one station, so that the position measuring can be achieved, while ensuring a certain degree of accuracy, even if a small number of base station radio waves can only be received.

Further, since the ID's of mobile telephone base stations are utilized for the position measuring, positional information can be provided without any transmission request from the user.

Further, since the position measuring by using satellites and the position measuring by using radio waves of cellular mobile telephone base stations are both in absolute positioning scheme, a distance sensor and an azimuth sensor, as required by conventional hybrid type navigation apparatuses, are eliminated, and error accumulation, found in these relative position measuring schemes, never occurs.

Further, since the position measuring is performed without utilizing vehicle speed pulses on the vehicle side, the present invention does not at all require complicated and difficult works for dismounting internal parts of the automotive vehicle to make the pulse available.

Further, since information such as traffic information, weather information, and so on can be provided as data from existing mobile telephone base stations, a dedicated transmission/reception system for traffic information and so on is not required. On the user side, it is not necessary to provide a dedicated receiver for traffic information, while on the system administration side, a dedicated infrastructure is not required, thereby reducing facility investment.

Further, a portion for communicating with mobile telephone base stations can also be used as a normal mobile telephone terminal, so that its application is extended as a terminal. Also, in the mobile telephone system called a PHS, since a telephone call is difficult to make during high speed movements, the driver will not call while driving, as is the case of ordinary portable telephones, thus contributing also to safe driving.

Further, new services can also be provided by connecting a variety of information services, music services, and so on such as Internet or the like.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. An information distribution method comprising:
   a request signal receiving step for receiving a service request signal from a user;
   a transmitting step for transmitting data containing music-related information from a base station of a mobile telephone network on a predetermined cell according to said service request signal;
   an audio signal generating step for generating audio signal by processing said data forming said music-related information;
   checking a transmission speed of the data transmitted from the base station;
   when the transmission speed of the data is at or above a predetermined rate, performing said audio signal generating step; and
   when the transmission speed of the data is below the predetermined rate, generating a data stream at every predetermined time with a portion of the data being missing and then performing said step of processing on said generated data stream.

2. The information distribution method according to claim 1 further comprising the step of:
   displaying to the user a listing of the music-related information transmitted from the base station.

3. The information distribution method according to claim 2 further comprising the step of:
   selecting a desired one from the displayed listing of music-related information using a wireless remote control unit.

4. The information distribution method according to claim 3 further comprising the step of:
   displaying words corresponding to the desired one of the music-related information selected in the step of selecting.

5. A music-related information distribution method, comprising the step of:
   transmitting a service request signal from a user at a mobile unit to a base station of a mobile telephone network;
   transmitting data containing music-related information from the base station on a predetermined cell of the mobile telephone network to the mobile unit according to the service request signal;
   receiving the transmitted data containing music-related information at the mobile unit;
   displaying a listing of the items contained in the received music-related information;
   selecting a desired item of music-related information from the displayed listing of items;
   generating an audio signal by processing the selected item of music-related information;
   checking a transmission speed of the data transmitted from the base station;
   when the transmission speed of the data is at or above a predetermined rate, performing said step of generating an audio signal; and
   when the transmission speed is below the predetermined rate, generating a data stream at every predetermined time with a portion of the data being missing and then performing said processing on said generated steam.

6. The music-related information distribution method according to claim 5, further comprising the step of:
   displaying words corresponding to the audio-signal based on the selected item of music-related information.

7. The music-related information distribution method according to claim 5, wherein the step of selecting includes using a wireless remote control unit.

8. The music-related information distribution method according to claim 5, wherein the step of displaying includes arranging a liquid crystal display screen in front of a user of the mobile unit.

* * * * *